UNITED STATES PATENT OFFICE.

HEINRICH BAUM, OF HÖCHST-ON-THE-MAIN, GERMANY, ASSIGNOR TO MEISTER, LUCIUS & BRÜNING, OF SAME PLACE.

IMPROVEMENT IN COLORING-MATTERS TO BE USED AS DYES.

Specification forming part of Letters Patent No. 210,233, dated November 26, 1878; application filed June 29, 1878.

*To all whom it may concern:*

Be it known that I, H. BAUM, of Höchst-on-the-Main, Germany, have invented an Improved Dye and process of preparing it, of which the following is a specification:

The object of the invention is to furnish to the public substitutes for cochineal, annotto, and archil in dyeing and printing.

The invention consists in manufacturing red, yellow, and brown colors from the two disulfobetanaphtholic acids by means of diazo compounds of xyloidine.

To produce the disulfobetanaphtholic acids, one part of betanaphtholic is mixed with three parts of sulphuric acid, the mixture being heated for twelve hours at a temperature of 212° to 230° Fahrenheit. Two isomere-disulfobetanaphtholic acids are thereby obtained, from which the soda salts are easily separated by being digested with three or four parts of alcohol, the salt that is insoluble in alcohol being filtered and dried, while the soluble salt is extracted by evaporation and dried. The first furnishes the red and the latter the yellow shades of the dye.

To obtain the coloring, six and one-half parts of xyloidine are dissolved in twelve parts of muriatic acid (specific gravity 1.16 to 1.18) and one hundred parts of water, to which are added four and one-half parts of pure nitrite of potash. This solution is poured into a solution of the above-described betanaphthol, insoluble salt dissolved in two hundred parts of water and ten parts of ammonia, (ten per cent.,) when the coloring-matter is precipitated in the form of a paste. The latter is dissolved, the coloring-matter precipitated with salt, and a dry powder is thereby obtained, which will give a lighter yellow scarlet color to wool or silk and wool-dyeing, and will stand light and soaping.

By using the soluble salt a permanent dye of a deep-red scarlet color is obtained.

I do not limit myself to the exact proportions, as they may be varied without departing from the principle of my invention.

What I claim as new is—

1. A dye formed by the reaction of the di-sulfobetanaphtholic acids and the diazo compound of xylole, substantially as described.

2. The process of making scarlet dyes by treating the diazo compounds of xylole with the isomere forms of the sulfobetanaphtholic acids, as set forth.

In witness whereof I have hereunto set my hand this 8th day of June, 1878.

HEINRICH BAUM.

Witnesses:
 FRANZ WIRTH,
 FRANZ HASSLACHER.